Sept. 2, 1941.  E. W. CARROLL  2,254,594
FULL AUTOMATIC ORIENTATOR
Original Filed June 1, 1938 4 Sheets-Sheet 1
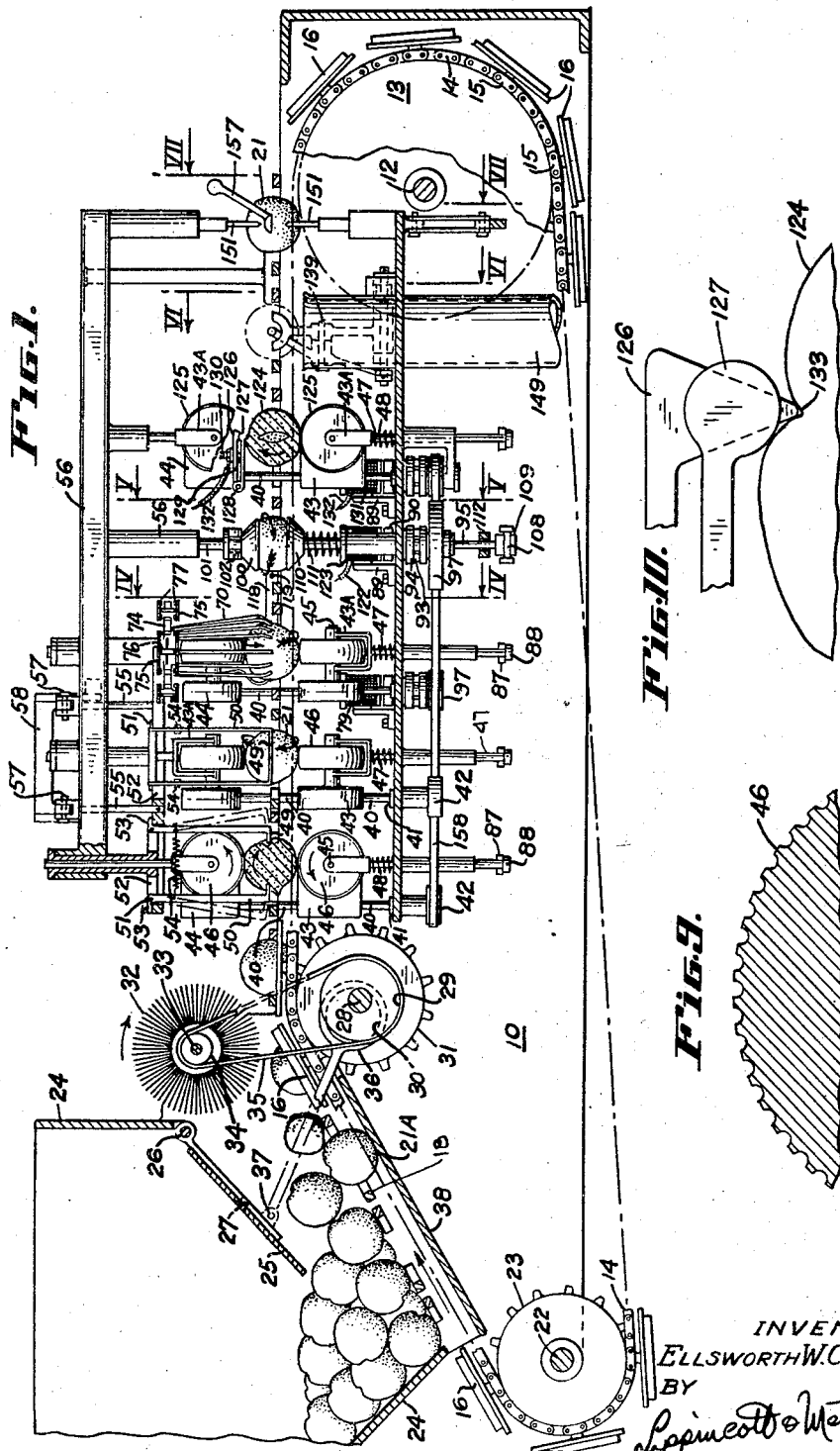
INVENTOR
ELLSWORTH W. CARROLL
BY
Lippincott & Metcalf
ATTORNEYS

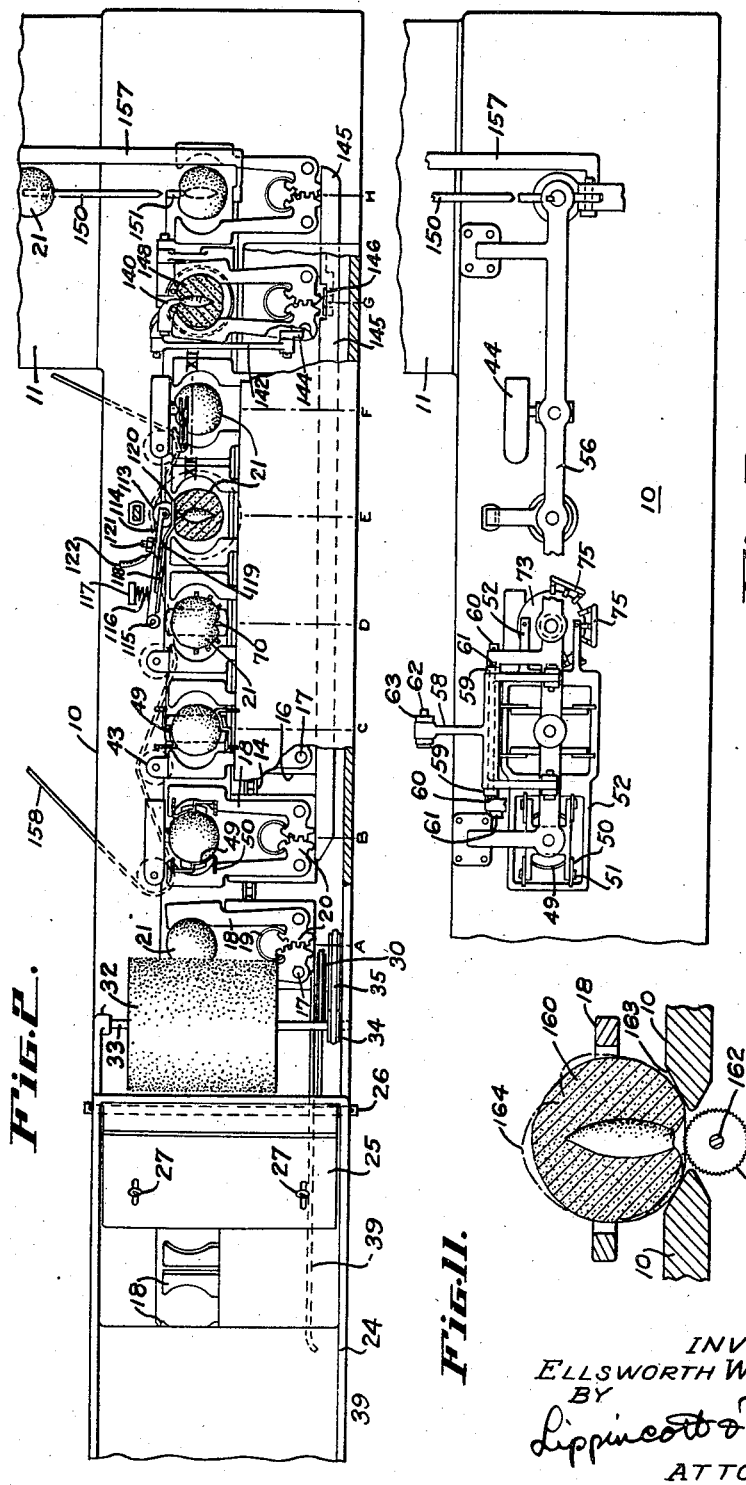

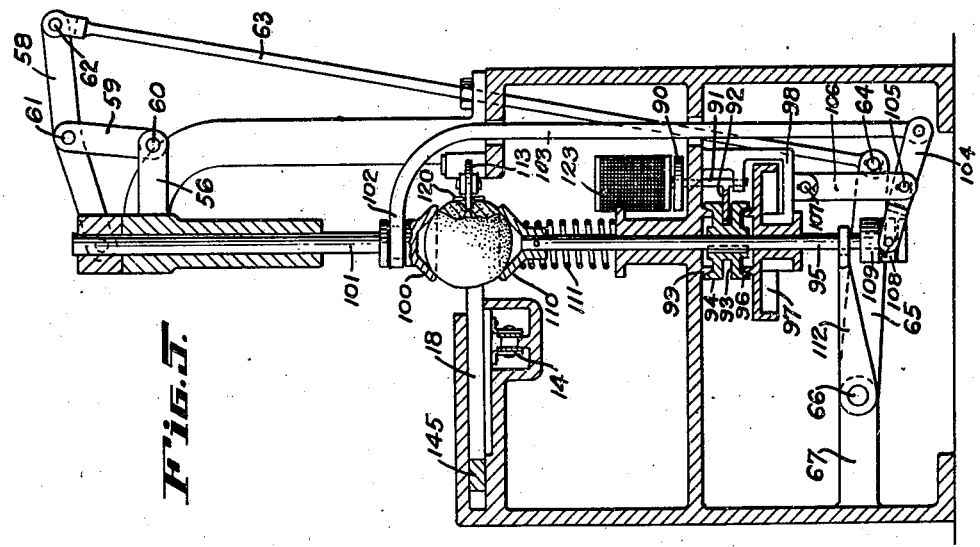

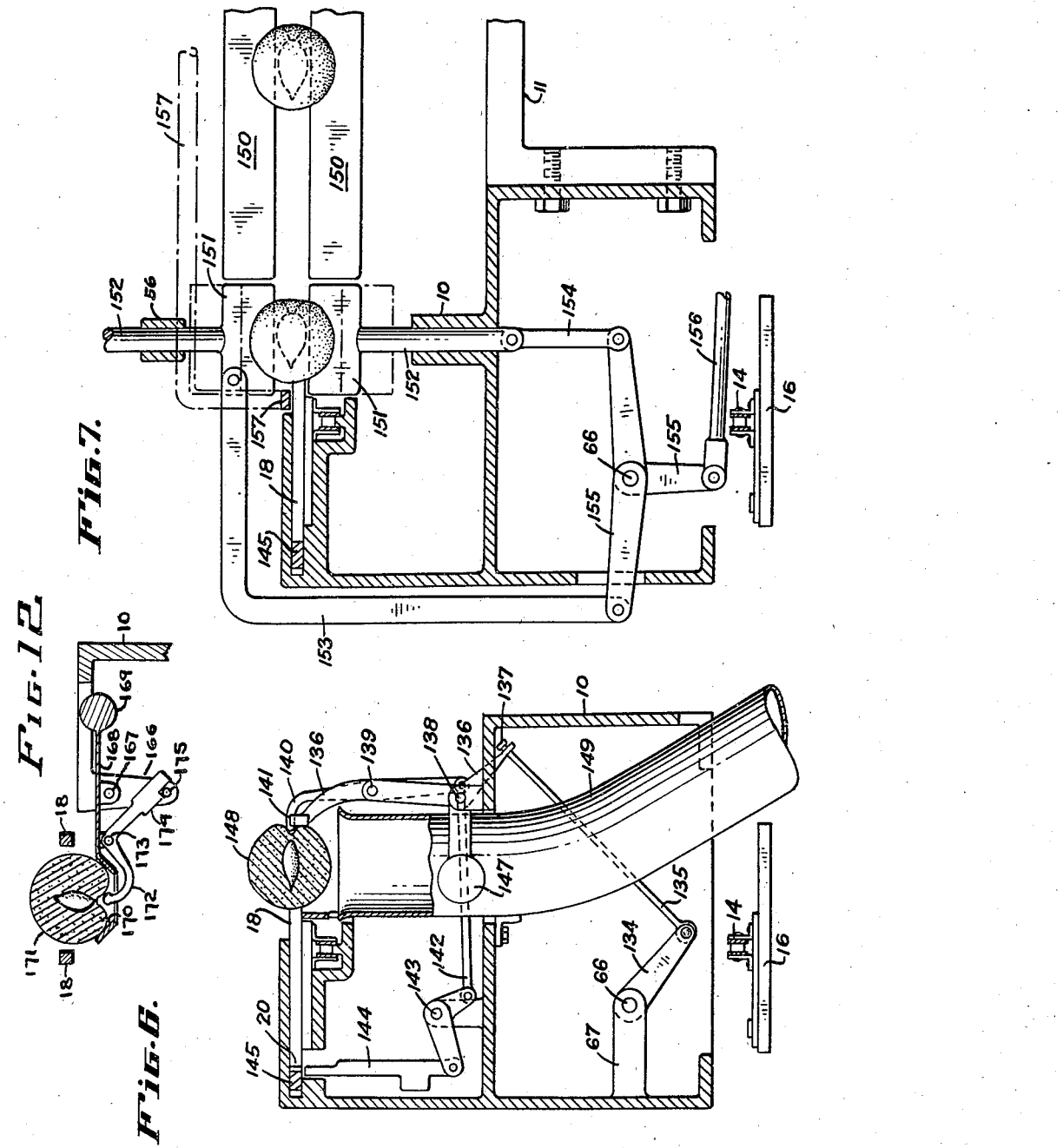

Patented Sept. 2, 1941

2,254,594

UNITED STATES PATENT OFFICE 2,254,594

FULL AUTOMATIC ORIENTATOR

Ellsworth W. Carroll, San Francisco, Calif., assignor to S & W Fine Foods, Inc., San Francisco, Calif., a corporation of California Original application June 1, 1938, Serial No. 211,140. Divided and this application November 13, 1939, Serial No. 304,108

17 Claims. (Cl. 198—33)

My present invention relates to orientators, and in the present embodiment more particularly to fruit orientators.

This application is a division of my co-pending application for United States Letters Patent, Serial No. 211,140, filed June 1, 1938, entitled "Full automatic orientator."

When pitting fruit such as peaches, cherries, or the like, by machine it has heretofore been necessary to orientate the fruit manually.

The primary object of this invention is to provide a full automatic machine which will take the fruit from a hopper (where the fruit is poured in haphazardly), orientate the stem indent to a predetermined position in relation to the machine and deliver the fruit to a pitting machine in this same predetermined relative position.

Another object is to provide a machine which will in addition to the above, inspect the fruit for proper orientation, reject the non-orientated fruit and deliver the properly orientated fruit as above.

Another object is to provide a machine which will in addition to all the foregoing, orientate the seam which is characteristic of such fruit as peaches and apricots, inspect the fruit for properly orientated seams, reject the fruit having non-orientated seams and deliver the orientated fruit to a pitting machine with the seams and stem indent in proper position (relative to the machine) for pitting.

Another object is to provide a machine which will sever the tips from fruit such as peaches.

Another object is to provide a hopper which will insure an extremely slow but absolutely uniform delivery of contents and more especially when the contents are non-rigid bodies such as fruit.

Another object is to provide an invention which will be equally well adapted to orientating fruit to a vertical, horizontal, or to any other position of the major axis of the fruit, thereby making this invention practical for use on any type of pitting machine.

Other objects and advantages will be evident to those skilled in this art.

The mechanism to be first described is particularly adapted for use with that type of pitting machine having a reciprocating feed bar pushing the fruit along a track consisting of two knife-like guideways embedded in the meat of the fruit, and in which the fruit is held with its major axis (that is, a line passing through the blossom end and the stem end) in a horizontal position while removing the pits.

The mechanism shown for severing the tips and locating the side seams of such fruit as peaches would obviously be omitted when building a machine to orientate fruit which does not have such characteristics, without departing from the spirit of this invention.

I will later on describe a mechanism more particularly adapted to orientate fruit to a stem downward position, and to inspect for proper orientation in this position.

The changes necessary to the mechanism shown to orientate fruit to any other relative position are comparatively simple and will be readily understood by those skilled in this art.

For a better understanding of the invention, reference should be made to the accompanying drawings, wherein there is shown by way of illustration and not of limitation, preferred embodiments thereof.

In the drawings wherein like numerals refer to like parts throughout the various views:

Fig. 1 shows a front elevation of this machine with the front wall removed.

Fig. 2 shows a top or plan view of this machine, but with the extreme upper superstructure removed.

Fig. 3 is a top or plan view showing those parts which were removed from Fig. 2.

Fig. 4 is a transverse vertical view taken at lines IV—IV of Fig. 1, looking in the direction shown by arrows, showing the mechanism of station D for orientating the stem indent to a horizontal plane.

Fig. 5 is a transverse vertical view taken at lines V—V of Fig. 1, looking in the direction shown by arrows, showing the mechanism of station E, for orientating the stem indent to the shown position.

Fig. 6 is a transverse vertical view taken at lines VI—VI of Fig. 1, looking in the direction shown by arrows, showing the mechanism of station G, to inspect for proper orientation.

Fig. 7 is a transverse vertical view taken at lines VII—VII of Fig. 1, looking in the direction shown by arrows, showing the mechanism of station H, the exit station.

Fig. 8 shows in perspective a unit of three fingers of Fig. 4.

Fig. 9 shows the preferred construction for the periphery of rollers made from material having a smooth or slick surface.

Fig. 10 shows an enlarged view of the ends of the two fingers which ride the peach to detect the seam.

Fig. 11 shows an alternate construction of the orientating means.

Fig. 12 shows an alternate type of inspection and rejection means.

Similar numerals refer to similar parts throughout the several views.

In the drawings 10 designates generally a housing within which and upon which the operating parts of the orientating mechanism are mounted.

The housing 10 is secured to and supported by the pitting machine, a part of which is shown at 11 in Fig. 2.

Referring to Fig. 1: Journaled within the pitting machine and extending into the orientator is the drive shaft 12, having secured thereon the sprocket 13 which drives the endless chain 14 having attachment links 15 which carry the plates 16.

Referring now to Fig. 2: The plates 16—16 are provided with pivots 17—17 for the tongs 18—18 which are biased inwardly by the C-shaped spring 19 and provided with interlocking gear segments 20 to insure uniform centralizing action of the concave faces which contact the fruit 21.

In Fig. 1 the housing 10 is provided with bearings for the shaft 22 which carries the sprocket 23 for the return of the chain 14, which then passes through the hopper 24 in the direction shown by the arrow which has an oscillating bottom 25, hinged thereto at 26. This oscillating bottom is adjustable for length and secured at the desired length by screws 27.

The housing 10 is also provided with bearings for the shaft 28 having secured thereto the pulley 29, the eccentric 30 and the sprocket 31, all of which are rotated by the chain 14.

The cylindrical bristle brush 32 is secured to the shaft 33 which is journaled in the housing 10 and driven by the tight pulley 34, which is in turn driven by the belt 35 from the pulley 29. The eccentric 30 is journaled in the eccentric strap 36 which is pivoted at 37 to the hopper bottom 25, thus oscillating the latter. The hopper 24 is also provided with a stationary bottom 38.

It is well known to everyone who has attempted to secure a slow and uniform feed of fruit (or other non-rigid bodies) from the bottom of a hopper, that the chief difficulty to be overcome is the fact that after the first few fruits or objects have left the hopper, the remaining fruit will be found to have formed an arch over the exit, thus stopping the flow. To overcome this objection, the oscillating bottom 25 is provided to agitate the fruit just enough to prevent these arches being formed. It is also found necessary to provide a space where a few fruits can ride the exiting means (the tongs 18 in this case) free of any superimposed fruit, this space providing a reserve supply of fruit to fill any empty openings, in case the crowding or superimposed weight at the extreme bottom of the hopper prevent filling all openings in the exiting means at the extreme bottom point. As the tongs 18 are carried through the hopper 24 they are held open by a stationary cam track 39—Fig. 2 (which forces the ends of the segments 20 inwardly, thus separating the tongs 18), to receive a peach 21—A in Fig. 1, the track 39 being secured to the hopper bottom 38, all surplus fruit being brushed back by the brush 32 traveling in the direction indicated by the arrow.

In Fig. 1 the vertical shafts 40 are journaled in the housing 10 and restrained from vertical movement by the collars 41, and the pulleys 42 affixed thereto. The gear housings 43—44 are journaled on the shafts 40 and are free also for axial movements thereon. Within each housing 43—44 is a pair of spiral gears (not shown). One of these spiral gears is slidably mounted on the vertical shaft 40 which has a sliding keyway so as to revolve the gear with the shaft 40, but yet permit of a free axial movement. This first gear meshes with and drives its mate which is secured to the shaft 45, which is journaled in the housings 43 and 44 and in the fork 43—A which is a part of the respective housings. The shaft 45 has fixed thereon the roller 46 which is preferably made of sponge rubber. Should it be desirable to use some other material, especially a material having a smooth surface, a serrated face is recommended (such as is shown in Fig. 9).

The housings 43 and 44 are provided with the slidably mounted stems 47 and with coiled compression springs 48 which are just strong enough to give the desired pressure on the fruit.

A thin, narrow curved knife is shown at 49, suspended by the upwardly extended arms 50 and pivoted at 51 to the frame 52 and having outwardly extending fingers 53 and also provided with comparatively light tension springs 54 to bias the two knives 49 against the fruit so that when the fruit is revolved by the rollers 46 all protuberances will be cut off.

A plurality of tip cut-off knives 49 is preferable, because the radius of the knives being fixed while the radius of the fruit varies, therefore the shorter the cutting edge of the knife 49 is, the less noticeable will be the result of this difference in radii. See Fig. 2.

Secured to the frame 52 are the stems 55 which are slidably mounted in the top frame 56, and which have the upper ends bifurcated and pivoted at 57 to the bifurcated ends of the lever 58, best shown in Fig. 3. The link 59 in Fig. 5 is pivoted at 60 to the frame 56 and at 61 to the lever 58, the latter being pivoted at 62 to the connecting rod 63, which is pivoted at the lower end at 64 in Fig. 5 to the lever 65 which is secured to the shaft 66 which is suitably mounted for oscillation in the brackets 67 of the housing 10. The shaft 66 will be further described later on.

In Fig. 4 the quill 68 is mounted to slide freely on the stem 47 and in the frame 56, with a collar 69 to halt the downward travel in the position shown. The quill 68 has a suitable mounting at the lower end for a series of radially mounted oscillating fingers 70 which are pivoted at 71 and provided with a lug 72 fitted to engage the disc 73 which is secured to the extensions of the frame 52. (See also Fig. 3). The lower end of the fingers 70 are rounded off and smooth, to freely ride the peach 21, and are held in engagement with the peach by the counterweights 74.

The fingers 70 are arranged radially to contact one half the periphery of the peach 21 on the horizontal centerline at regularly spaced intervals, and are preferably arranged in groups of three fingers per unit as follows:

In Fig. 8 the counterweights 74 of the center member of the unit has secured thereto two electrical contact bars 75, but electrically insulated therefrom by the non-conductors 76. The counterweights 74 of the two adjacent fingers are equipped with electrical contact points 77 grounded to the housing 10. The contact bars 75 are so spaced that minor irregularities in the surface of the fruit will not make a contact with the points 77, but so that a major relative movement of the fingers 70 such as is caused by any one of the three fingers 70 of that unit dropping into the stem indent will establish an electrical circuit. The bars 75 are provided with electrical conductors 78, which are joined together and led to the electro-magnet 79, Fig. 4, which has a conductor 80 which connects with any suitable source of electricity, which source is also grounded to the housing 10 in order to complete the circuit. The conductor 80 is also provided with a switch (not shown) controlled by the pitting machine 11 for interrupting the current while the chain 14 is being advanced, as will be described later.

Referring to Fig. 4, the link 81 suitably connecting the two housings 43—44 through the medium of the lever 82, which is pivoted at 83 on the bracket 84 of the housing 10, with a slot 85 sliding on the pin 86, which is secured to the fork 43—A, forms an equalizing gear, which is common to each pair of the gear housings 43—44. The lever 87 is secured to the shaft 66 and bifurcated at the opposite end so as to engage the collar 88, and thus provide means for separating the housings 43 and 44 as the lever 87 is moved downward. Fig. 1 shows the electromagnet 79 having suitable brackets 89 and being attached to and supported by the housing 10.

In Fig. 5 the armature 90 is fixed to the rod 91 which is slidably mounted in the housing 10 and provided at the lower end with a shifting fork 92 which is rotatably engaged with the groove 93 of the sliding clutch member 94, which is slidably keyed to the shaft 95. The sliding clutch member 94 is provided with a cone clutch face at 96 which engages a mating clutch face secured to the pulley 97 which is journaled in the bracket 98 extending from the housing 10. The upper end of the sliding member 94 forms a conical brake 99 with the mating member secured to the housing 10. The sliding clutch member 94 is held in clutch driving engagement by gravity as long as the electro-magnet 79 is not energized.

In Fig. 5 the hollow conical cup 100 is secured to the stem 101, which is slidably journaled in the frame 56 and connected with a thrust bearing at 102 to the upper end of connecting rod 103 which is pivoted to the equalizing lever 104, which is pivoted to the link 106 which is pivoted at 107 to the bracket 98 of the housing 10. The opposite end of the equalizing bar 104 is bifurcated and pivoted to the thrust collar 108 which is journaled between the flanges 109 which are fixed to the shaft 95, the above mechanism forming an equalizing gear to move the cup 100 and the cup 110 in opposite directions simultaneously. These cups 100 and 110 are biased toward each other by the spring 111 and separated while changing fruits by the lever 112 which is fixed on the shaft 66 and bifurcated at the opposite end to properly engage the flange 109. These cups 100 and 110 are preferably made with a conical included angle of 90° and to properly hold the fruit when biased together by the spring 111 and with the lever 112 in the shown position.

In Fig. 2 the roller 113 is journaled at the end of the lever 114 which is pivoted on the stud 115 which is supported by the housing 10 to which it is affixed. The lever 114 is biased toward the peach with a comparatively heavy spring 116 mounted in the spring seat 117 which is a projection of the housing 10, and has secured to itself near the pivoted end 115 a comparatively light leaf spring 118 biased away from the lever 114, having an electrical contact point 119, which is grounded to the housing 10, and terminates in the fork 120 which rides the peach lightly. The lever 114 has an insulated adjustable electrical contact point 121 so mounted that when the peach 21 which is held and revolved by the cups 100 and 110 has been turned to that position at which the roller 113 enters the stem indent, an electrical circuit is completed through the electrical conductor 122 which leads to the electro-magnet 123 in Fig. 1, which is connected to any suitable source of electrical energy (not shown) which is also grounded to the housing 10, to complete the circuit.

The foregoing mechanism is so constructed that the contact points are separated by the light spring tension of the leaf spring 118 at all times except when the roller 113 enters the stem indent, at which time the spring 116 overcomes the comparatively light spring 118, thus forcing the contact points 119 and 121 together. The circuit thus completed energizes the electro-magnet 123 which lifts the armature 90 which disconnects the clutch and instantly sets the brake as has been previously described, and thus stops the peach with the stem indent in the predetermined position.

In Fig. 1 the peach 124 is shown in a section taken on the lines XI—XI of Fig. 2 and is held and revolved between and by the rollers 125, which are mounted with the housings 43—44, and shaft 40, and equipped with the equalizing gear as before described, as well as with an electro-magnet operated clutch and brake mechanism such as was previously described at 96 and 99 of Fig. 5. In Fig. 1 the levers 126 and 127 are freely pivoted to the housing 44 at 128 and held in contact with the peach by gravity. The lever 127 carries the grounded to housing 10 contact point 129 and terminates in a disc with a comparatively large radius best shown in Fig. 10, which also shows the comparatively small radius of the finger 126. The finger 126, Fig. 1, carries the insulated adjustable contact point 130 connected to the electro-magnet 131 by the electric wire 132. These points 129 and 130 are adjusted so that they will make contact only when a sharp seam similar to the seam 133 in the peach 124 in Fig. 10 permits the small radius of lever 126, Fig. 10, to overrun the larger radius of lever 127. Thus occasional flat spots or bruises from handling are prevented from operating the stopping and braking mechanism, this stopping and braking mechanism being similar to that which has been previously described in Fig. 5, parts No. 79, 96 and 99.

This seam detecting mechanism can be made still more selective by elongating the axial length of the seam entering short radius of the lever 126.

In Fig. 6, which shows the inspection station, the shaft 66 has affixed thereto the lever 134 pivoted to the connecting rod 135 which passes freely through a slot in the bellcrank 136 and terminates in a flange 137 which will not pass through this slot. The bellcrank 136 is pivoted at 138 to the lug of the housing 10 and has a pivot 139 to support the lever 140 and terminates in a semi-annular seat 141 to fit the base of the average sized fruit when the fruit is being held in the tongs 18. The top of lever 140 is bent and passes through the center of the seat 141, while the lower end is pivoted to the connecting rod 142 which is pivoted to the bellcrank 143 which is pivoted on the lug extension of the housing 10, while the opposite end is pivoted to the upright spacing bar 144.

The spacing bar 144 is provided with a counterweight to bias the top of the bar 144 toward the left in Fig. 6. The tongs operating bar 145 must slide from the position shown, to the left, approximately against the wall of the housing 10 and back again, this lateral motion being derived, through suitable means (not shown) from the pitting machine 11.

This bar 145 is so adjusted that when in the position shown in Fig. 2, it will engage the ends of the gear segments 20 and open the tongs 18 at all operating stations except station G in Fig. 2, which is shown in transverse section in Fig. 6. This exception at station G is accomplished by notching the bar 145 as at 146 to a depth greater than the travel required by the segments 20 to fully open the tongs 18. The top of the spacing bar 144 in Fig. 6 is of the same dimensions as, and registers with, the notch 146, so that when the bar 144 is raised while the bar 145 is in the leftward position, into the notch 146, a movement of the bar 145 to the rightward position will open the tongs at station G the same as at the other stations.

In Fig. 6 a downward movement of the lever 134 pulls the top of the bellcrank 136 away from the fruit 148 which is necessary when changing fruits, and the return stroke with its over travel permits the seat 141 to be biased by the counterweight 147 to contact the peach 148 regardless of the size of the latter. When the peach 148 is properly orientated the top or bent end of the lever 140 will enter the stem indent and position the spacing bar 144 as shown. However, should the peach 148 be improperly orientated; that is, having the stem indent in any other relative position, the lever 140 will be forced to the right in Fig. 6 relative to seat 141, which will raise the bar 144 to result in opening the tongs 18, as previously described, thus dropping the peach 148 into the reject discharge chute 149 which is secured to the housing 10.

Fig. 7 shows a transverse sectional view of the transfer station where the properly orientated fruit is fed to the pitting machine 11, only a fragmentary section of which is shown, having the stationary opposed knifelike guideways 150 to guide and support the fruit.

The orientator has a short section of similar but separable guideways 151 registering when advanced, with the stationary guideways 150. The guideways 151 are secured to the stems 152 which are slidably mounted in the housing 10 and frame 56, and positively opened and closed by the links 153 and 154, which are pivoted to the double bellcrank 155 which is secured to the shaft 66 and actuated by the connecting rod 156 leading to the pitting machine 11 by which it is actuated.

Fig. 2 shows a push bar 157 supported and actuated by the pitting machine 11. In Fig. 1 the pulleys 42 and 97 which drive the fruit revolving mechanisms are driven by a belt 158 which is interwoven between the various pulleys in order to drive each, and then passing to and back from the pitting machine 11, by which it is driven (see also Fig. 2).

The pitting machine 11 of necessity has a cam shaft (not shown) to operate and synchronize the pitting mechanism, and inasmuch as the orientating must also be synchronized in step with the pitting, it is in the interests of convenience, accuracy of synchronization and economy to use this pre-existing cam shaft to operate and synchronize the orientating mechanisms.

The functions to be thus operated and synchronized are, first, the endless chain 14 (Fig. 1) opening the tongs 18, raising and lowering the revolving rollers 46 and 125, the cups 100—110 and the guideways 151. Also retracting the inspecting levers 140—141, as well as raising and lowering the frame 52, which carries the tip cutoff knives 49 and the fingers 70 at station D; all of which must be advanced or operated intermittently as previously described.

*Operation*

After a particular peach finally reaches the extreme bottom of the hopper 24, or the free space between the hopper and the tongs, it will drop into the opening between the tongs 18 which are being forced open by cam 39, and be carried forward step by step until it reaches the station A, where due to the termination of the cam 39, the tongs 18 will grip the peach, due to pressure of the spring 19, Fig. 2.

The tongs 18 still gripping the peach 21 will on the next cycle carry it forward to the tip removing station at B, where the peach 21 is clamped between the two rollers 46 of Fig. 1, which are not revolving at this time. Instantly, upon the completion of the chain 14 advance, five objects are completed simultaneously. Firstly, the tip cut-off knives 49 and the fingers 70 which are all carried by the frame 52 are lowered to position as shown in Fig. 1. Secondly, the rollers 46 and 125 and the cups 100—110 are advanced to contact and hold and later to revolve their respective fruits, being biased thereto by the springs 48 and 111. Thirdly, the inspection levers 140—141 are biased to operating position by the counterweight 147. The object of providing a flexible means for bringing the rollers and inspection levers into contact with the fruit is, first to prevent bruising the fruit, and second to accommodate the variations in both size and profile. Fourthly, the retractable guideways 151 are brought into a positive operating engagement with the fruit, the entering edge of the guideways 151 being sharpened to cut into the fruit as shown in Fig. 7, all the four preceding objects being controlled by the pitting machine 11 through the rod 156 of Fig. 6, and the shaft 66 as previously described. Fifthly, the source of electrical energy for operating the electro-magnets is restored by the pitting machine 11 (not shown).

As previously described, the relative position of the detecting lever 140 to the seat 141 will be determined instantly upon contact with the peach 148, thus setting the space bar 144 in proper position. While the detecting lever 140 is being brought into contact with the fruit, the tongs operating bar 145 is retracted so the space bar 144 is free to enter the notch 146. As soon as the foregoing operations are completed the pitting machine will advance the tongs operating bar 145, thus opening the tongs so the fruit is free to be revolved, or to drop into the reject chute 149 if improperly orientated at this station.

Upon completion of the above, the belt 158 is immediately started by the pitting machine 11 and run far enough to turn each of the revolving fruit at least one and one-eighth revolutions by means previously described. However, the fruit at the orientating stations D, E and F, will be revolved only until the stem indent or seam registers with the detecting means, which will instantly stop the revolution of the fruit as previously described. The tip cut-off knives 49 should be set at a cutting angle that will not pare the peach but which will remove a protuberance such as the tip. With two knives 49, as shown in Fig. 2, each of which encircle slightly more than 45° of the periphery of the fruit, it is obvious that a full revolution of the fruit will subject the tip to the cutting action of either one knife 49 or the other, providing the tip lies within an arc of from 45° to 90° of a transverse horizontal axis. See Fig. 2—station B. However, should the tip be positioned between 0° and 45° from the horizontal transverse axis, and so as not to fall in the plane covered by the knives at station B, the knives at station C will sever the tip in the next cycle, because they are set at 90° from those at station B, the rollers 46 at station C being also turned 90° in order to revolve the fruit accordingly.

Operation of the belt 158 will simultaneously sever the tip and orientate both the stem indent and the seam. At the same time levers 141—142 will inspect for proper orientation and the pitting machine 11 will operate the push bar 157 to transfer the peach to the pitting machine and return the push bar 157 to the shown position in Fig. 7, all the foregoing while the chain 14 is at rest, and in accordance with the previous description.

Upon completion of the foregoing, the pitting machine now operates to stop the belt 158 and to retract the tongs operating bar 145 permitting the tongs 18 to again grip the fruit, and also to disconnect the source of electrical energy from the electro-magnets.

As soon as the fruit is secured by the tongs, the shaft 66 is operated, as previously described, to retract all the rollers 46 and 125, the cups 100—110, the inspection lever 140, the guideways 151, the knives 49 and the fingers 70. As soon as all these have been retracted to clear the path of the fruit, the pitting machine advances the chain 14 and consequently the tongs and fruit one station to the right in Fig. 1, thus completing the cycle, which is now ready to be repeated.

Fig. 11 shows means for orientating fruit to a stem end down position, which is preferable in many instances. This figure shows a fruit 160 which has just been orientated by the serrated roller 161, which is secured to the shaft 162 which is journaled in a lug (not shown) of the housing 10, and suitably and intermittently revolved by the pitting machine 11 through means not shown. The fruit 160 is shown resting on the shallow concave, conical face 163 of the housing 10. The relative size of the roller 161 to the stem indent in particular (and the fruit being orientated in a lesser degree) is very important, as is also the face 163 in its relation to the roller 161. The optimum relative size of the roller 161 is that which is as large as possible (to better revolve the fruit) yet small enough to project into the concave seat 163 far enough to revolve the fruit at all times when the stem indent is in any other relative position than down, as shown by the heavy lines 160. When the fruit is in this position the roller 161 must also be small enough to clear the stem indent, so that when a fruit is carried to the orientating station with the stem indent in some other position than down (such as shown by the broken line 164), by the tongs 18 while being clamped about the fruit as previously described, and while the roller 161 is stationary, the tongs 18 will then be opened far enough to permit the fruit to revolve, yet close enough to form a guide to retain the fruit directly over the roller 161, which is then revolved in either direction and with it the fruit, until the latter has reached the position shown at 160 where the roller 161 will continue to turn, but the fruit will stop, as it is now supported by the face 163 and the roller 161 is turning freely in the indent.

In actual practice it has been found that the proportions shown in Fig. 11 are very satisfactory and that the fruit revolves so erratically that it is invariably properly orientated to a stem down position before the fruit has made five revolutions.

After the roller 161 has completed a predetermined number of revolutions the roller is stopped, the tongs then close about the fruit 160 and are raised to clear the fruit from the seat 163 and the tongs are carried by the chain 14 as previously described to the next station and the cycle repeated.

Fig. 12 shows means to inspect the fruit for proper orientation (and reject all that is not properly orientated) in a stem downward position. In this design the frame 10 is provided with a lug 166 having a pivot 167 for the balance lever 168 which terminates at one end in the counterweight 169 which must be lighter than the fruit, and at the opposite end in an annular seat 170 to support the fruit 171. An inspecting finger 172 is pivoted at 173 to the lever 168 and provided with a counterweight 174 which also serves as a latch and is fitted to catch on the pin 175 which is secured to and projects from the lug 166.

In operation the tongs 18 are provided with means (not shown) for a vertical movement sufficient to lower the fruit 171 into the seat 170 before the tongs 18 are opened. The finger 172 is so fitted that improper orientation of the fruit 171 will raise latch 174 from the pin 175 so that the improperly orientated fruit will be spilled off the seat 170, which will then be returned to the shown position by the counterweight 169.

It will thus be seen that I have provided a machine which while full automatic, will orientate and pit fruits along a definite and predetermined axis, and thus mechanically perform operations heretofore only possible by slow, tedious manual work.

Furthermore, the uniformity of output is even better than with manual pitting and the production is high compared to prior methods of orientated pitting. It will also be obvious that uniform pitting along a definite axis insures a quality of output which will bring high prices with the best eye value.

While I have seen fit to describe my invention as applied to peaches and in a preferred form, equivalent means will of course be apparent to those skilled in the art or through the scope of the appended claims.

I claim:

1. A fruit orientating device comprising opposed rollers, means for depositing a fruit between said rollers, means for moving said rollers into resilient contact with said fruit, means for positively rotating said rollers to rotate said fruit, and means for stopping said rotation when the stem indent of said fruit is in a predetermined position.

2. A fruit orientating device comprising opposed rollers, means for depositing a fruit between said rollers, means for moving said rollers positively rotating said rollers to rotate said fruit, a finger contacting the surface of said fruit during rotation thereof, and means controlled by motion of said finger when dropping into the stem indent of said fruit for stopping further rotation of said fruit.

3. A fruit orientating device comprising opposed rollers, means for depositing a fruit between said rollers, means for moving said rollers into resilient contact with said fruit, means for positively rotating said rollers to rotate said fruit, a finger contacting the surface of said fruit during rotation thereof, means controlled by motion of said finger when dropping into the stem indent of said fruit for stopping further rotation of said fruit, and means for removing said fruit from between said rollers in the position assumed when stopped.

4. A fruit orientating device comprising opposed rollers, means for depositing a fruit between said rollers, means for moving said rollers into resilient contact with said fruit, means for positively rotating said rollers to rotate said fruit, a lever having a plurality of fingers on one end thereof with alined termini presented to said fruit, resilient means for creating contact of said termini with said fruit, and means controlled by motion of said lever when a fruit contacting terminus drops into the stem indent of said fruit for stopping further rotation of said fruit.

5. A fruit orientating device comprising opposed rollers, means for depositing a fruit between said rollers, means for moving said rollers into resilient contact with said fruit, means for positively rotating said rollers to rotate said fruit, a lever having a plurality of fingers on one end thereof with alined termini presented to said fruit, resilient means for creating contact of said termini with said fruit, a clutch between said roller and said roller rotation means, and means actuated by motion of said lever when a fruit contacting terminus drops into the stem indent of said fruit for disengaging said clutch.

6. A fruit orientating device comprising opposed rollers, means for depositing a fruit between said rollers, means for moving said rollers into resilient contact with said fruit, means for positively rotating said rollers to rotate said fruit, a lever having a plurality of fingers on one end thereof with alined termini presented to said fruit, resilient means for creating contact of said termini with said fruit, a clutch between said roller and said roller rotation means, a brake, and means actuated by motion of said lever when a fruit contacting terminus drops into the stem indent of said fruit for disengaging said clutch and simultaneously applying said brake to said rollers.

7. A fruit orientating device comprising opposed rollers, means for depositing a fruit between said rollers, means for moving said rollers into resilient contact with said fruit, means for positively rotating said rollers to rotate said fruit, a lever having a plurality of fingers on one end thereof with alined termini presented to said fruit, resilient means for creating contact of said termini with said fruit, a magnetic clutch between said rollers and said roller rotation means, and electrical contacts actuated by motion of said lever when a fruit contacting terminus drops into the stem indent of said fruit for controlling current supply to said magnetic clutch.

8. A fruit orientating device comprising opposed rollers, means for depositing a fruit between said rollers, means for moving said rollers into resilient contact with said fruit, means for positively rotating said rollers to rotate said fruit, and means for stopping the rotation of said fruit when a predetermined variation of fruit contour is in a predetermined position.

9. A fruit orientating device comprising opposed rollers, means for depositing a fruit between said rollers, means for moving said rollers into resilient contact with said fruit, means for positively rotating said rollers to rotate said fruit, and means actuated by a major variation of fruit contour for stopping said fruit.

10. A fruit orientating device comprising opposed rollers, means for depositing a fruit between said rollers, means for moving said rollers into resilient contact with said fruit, means for positively rotating said rollers to rotate said fruit, means for contacting the surface of said fruit at a predetermined point, and means for controlling the rotation of said fruit actuated by said surface contacting means when said latter encounters a predetermined fruit contour variation.

11. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, and means for relatively moving said housings to cause said fruit to be contacted by said rollers for rotation thereby in accordance with clutch condition.

12. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, and means for controlling clutch condition actuated by a predetermined change in fruit contour as said fruit rotates.

13. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, a finger having an end bearing against the fruit surface, and clutch control means actuated by motion of said finger due to movement thereof by a predetermined change in fruit contour during fruit rotation.

14. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, a finger having an end bearing against the fruit surface, and electric clutch control means actuated by motion of said finger due to movement thereof by a predetermined change in fruit contour during fruit rotation.

15. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, a finger having an end bearing against the fruit surface, and means actuated by movement of said finger for disconnecting said clutch when said finger encounters a predetermined change in fruit contour.

16. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, a finger having an end bearing against the fruit surface, and means actuated by movement of said finger for disconnecting said clutch when said finger encounters the stem indent of said fruit.

17. Fruit orientation apparatus comprising a frame, a vertical shaft mounted on said frame, a clutch on said shaft, means for rotating said shaft through said clutch, a pair of housings slidable on said shaft, a roller axle horizontally extending from each of said housings, gear means linking said axles with said shaft within said housings, opposed rollers on said axles, means for positioning a fruit between said rollers, means for relatively moving said housings to cause said fruit to be contacted by said rollers for rotation thereby in accordance with clutch condition, a finger having an end bearing against the fruit surface, and means actuated by movement of said finger for disconnecting said clutch when said finger encounters the seam of said fruit.

ELLSWORTH W. CARROLL.